(12) United States Patent
Lowe

(10) Patent No.: US 12,208,599 B2
(45) Date of Patent: Jan. 28, 2025

(54) PATINATED OR PATINA-READY METAL TRANSACTION CARDS AND MANUFACTURING PROCESSES

(71) Applicant: CompoSecure, LLC, Somerset, NJ (US)

(72) Inventor: Adam Lowe, Somerset, NJ (US)

(73) Assignee: CompoSecure, LLC, Somerset, NJ (US)

( * ) Notice: Subject to any disclaimer, the term of this patent is extended or adjusted under 35 U.S.C. 154(b) by 811 days.

(21) Appl. No.: 17/166,080

(22) Filed: Feb. 3, 2021

(65) Prior Publication Data

US 2021/0162700 A1 Jun. 3, 2021

Related U.S. Application Data

(62) Division of application No. 15/877,553, filed on Jan. 23, 2018, now Pat. No. 10,946,611.

(Continued)

(51) Int. Cl.
*B32B 3/30* (2006.01)
*B32B 15/00* (2006.01)
*B32B 15/20* (2006.01)
*B32B 33/00* (2006.01)
*B42D 25/00* (2014.01)

(Continued)

(52) U.S. Cl.
CPC ............... *B32B 3/30* (2013.01); *B32B 15/00* (2013.01); *B32B 15/20* (2013.01); *B32B 33/00* (2013.01); *B42D 25/00* (2014.10); *B42D 25/373* (2014.10); *B44C 1/14* (2013.01); *B44D 5/00* (2013.01); *G06K 19/02* (2013.01); *G06K 19/07722* (2013.01); *B32B 2307/40* (2013.01); *B32B 2310/0409* (2013.01); *B32B 2310/0445* (2013.01); *B32B 2311/12* (2013.01); *B32B 2425/00* (2013.01); *B42D 25/415* (2014.10); *B42D 25/445* (2014.10); *C23C 22/52* (2013.01); *C23C 22/63* (2013.01); *G06K 19/041* (2013.01)

(58) Field of Classification Search
None
See application file for complete search history.

(56) References Cited

U.S. PATENT DOCUMENTS 3,073,760 A * 1/1963 Wittrock ............... C25D 11/246
148/272
4,042,468 A * 8/1977 Hasegawa ............... C25D 11/14
205/174
(Continued)

FOREIGN PATENT DOCUMENTS

ES 2525615 A1 12/2014
GB 393039 6/1933
(Continued)

OTHER PUBLICATIONS

European Communication pursuant to Article 94(3) EPC for European Application No. 18 706 331.8, dated Aug. 25, 2020, 7 pages.
(Continued)

*Primary Examiner* — Alexander M Weddle
(74) *Attorney, Agent, or Firm* — Buchanan Ingersoll & Rooney PC

(57) ABSTRACT

A non-provisioned card having a front side and a back side, and at least one visible surface that is patinated or activated to promote patination.

49 Claims, 1 Drawing Sheet

Related U.S. Application Data

(60) Provisional application No. 62/450,792, filed on Jan. 26, 2017.

(51) Int. Cl.

| | |
|---|---|
| *B42D 25/373* | (2014.01) |
| *B44C 1/14* | (2006.01) |
| *B44D 5/00* | (2006.01) |
| *G06K 19/02* | (2006.01) |
| *G06K 19/077* | (2006.01) |
| *B42D 25/415* | (2014.01) |
| *B42D 25/445* | (2014.01) |
| *C23C 22/52* | (2006.01) |
| *C23C 22/63* | (2006.01) |
| *G06K 19/04* | (2006.01) |

(56) References Cited

U.S. PATENT DOCUMENTS

| | | | |
|---|---|---|---|
| 4,416,940 A | 11/1983 | Loye et al. | |
| 4,692,373 A | 9/1987 | Welz et al. | |
| 5,344,671 A | 9/1994 | Wottrich | |
| 9,254,550 B2 | 2/2016 | Haverty et al. | |
| 2004/0076802 A1* | 4/2004 | Tompkin | G03H 1/0011 |
| | | | 428/174 |
| 2004/0217178 A1* | 11/2004 | Lasch | G06K 19/07728 |
| | | | 235/488 |
| 2005/0011750 A1 | 1/2005 | Greenberg | |
| 2009/0239034 A1 | 9/2009 | Lamb | |
| 2011/0031319 A1* | 2/2011 | Kiekhaefer | G06K 19/07722 |
| | | | 235/492 |
| 2012/0052198 A1 | 3/2012 | Stecker | |
| 2012/0171439 A1 | 7/2012 | Kharchenko et al. | |
| 2014/0158773 A1 | 6/2014 | Blum | |
| 2015/0115039 A1 | 4/2015 | Mosteller | |
| 2015/0180229 A1 | 6/2015 | Herslow | |
| 2015/0339564 A1* | 11/2015 | Herslow | B32B 15/20 |
| | | | 156/60 |
| 2016/0004944 A1 | 1/2016 | Mosteller | |
| 2016/0110639 A1 | 4/2016 | Finn et al. | |

FOREIGN PATENT DOCUMENTS

| | | |
|---|---|---|
| JP | 10503440 A | 3/1998 |
| JP | 2006512686 A | 4/2006 |
| JP | 2011504409 A | 2/2011 |
| JP | 2013506758 A | 2/2013 |
| JP | 2013063663 A | 4/2013 |
| WO | 2004063977 A2 | 7/2004 |
| WO | 2018140388 A1 | 8/2018 |

OTHER PUBLICATIONS

Indian Examination Report for Indian Application No. 201917028847, dated Sep. 24, 2020, with translation, 5 pages.

Invitation to Pay Additional Fees with Communication Relating to Partial International Search Report for International Application No. PCT/US2018/014820, dated Apr. 5, 2018, 11 pages.

International Preliminary Report on Patentability for International Application No. PCT/US2018/014820, dated Dec. 10, 2018, 6 pages.

International Search Report and Written Opinion for International Application No. PCT/US2018/014820, mailed Jun. 14, 2018, 16 pages.

"Patina 101: What is metal patina?" from http://rawurth.com/patinas/, Aug. 12, 2016; hereafter referred to as "Patina 101", 2016, 4 pages.

"Patina", Wikipedia, the free encyclopedia, Jan. 21, 2017, retrieved from the internet at https://web.archive.org/web/20170123191249/https://en.wikipedia.org/wiki/Patina, 2 pages.

"The Thor RFID Shield—Precision Copper Construction", Superior Titanium, Oct. 12, 2014, downloaded from https://web.archive.org/web/20141012081818/https://www.superiortitanium.com/thor-RFID-shield.html, 4 pages.

Entire patent prosecution history of U.S. Appl. No. 15/877,553, filed Jan. 23, 2018, entitled, "Patinated or Patina-Ready Metal Transaction Cards and Manufacturing Process."

European Communication pursuant to Article 94(3) for European Application No. 18706331.8, dated Feb. 22, 2021, 6 pages.

Chinese Office Action for Chinese Application No. 201880008579.2, dated Mar. 10, 2021 with partial translation, 10 pages.

Japanese Notice of Reasons for Rejection for Japanese Application No. 2019-540442, dated Jun. 29, 2021, with translation, 8 pages.

Kato, H. et al., "Coloring Finish of Metal Surface Following Some Traditional Methods—Coloring of Silver and its Effect," 2004, vol. 43, pp. 1-9, Science for Conservation.

Japanese Notice of Reasons for Rejection for Japanese Application No. 2019-540442, dated Mar. 18, 2022 with translation, 17 pages.

Office Action issued Dec. 1, 2023, by the Brazil Patent Office in corresponding Brazilian Patent Application No. BR112019014160-0 and an English translation of the Office Action. (9 pages).

\* cited by examiner

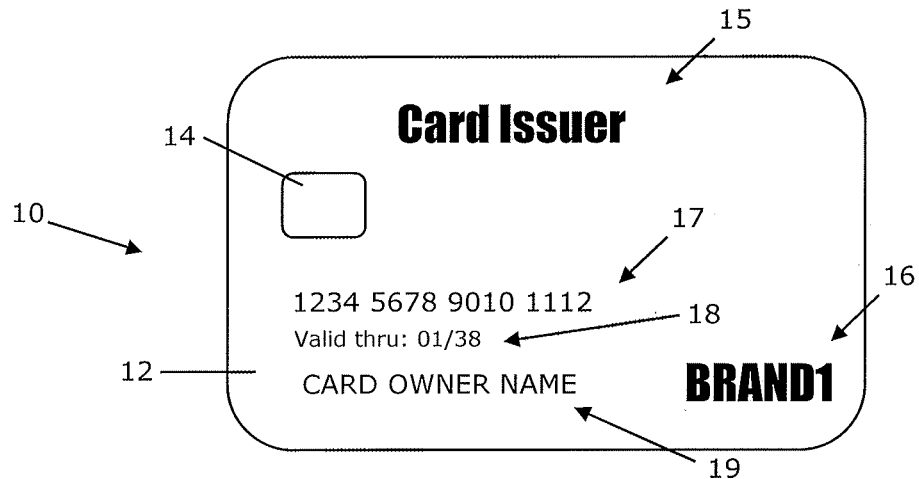
FIG. 1
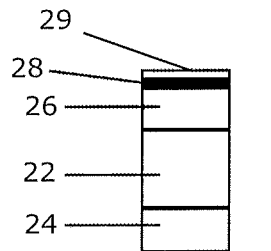 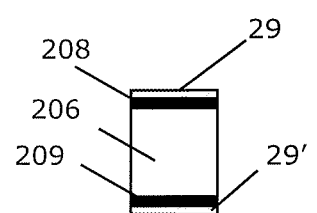 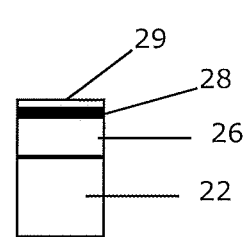
FIG. 2A   FIG. 2B   FIG. 2C
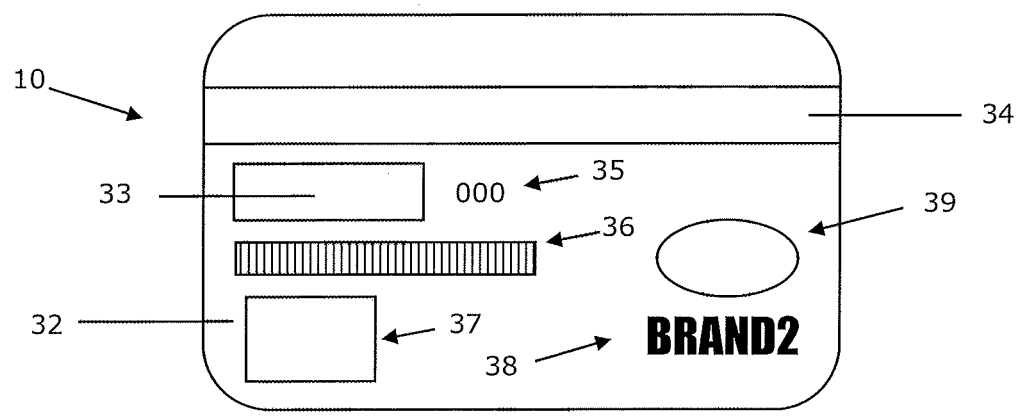
FIG. 3

PATINATED OR PATINA-READY METAL TRANSACTION CARDS AND MANUFACTURING PROCESSES

CROSS-REFERENCE TO RELATED APPLICATION

This application is a divisional application of U.S. patent application Ser. No. 15/877,553, filed Jan. 23, 2018, which claims priority to U.S. Provisional Patent Appl. No. 62/450,792, filed Jan. 26, 2017, which is incorporated by reference herein in its entirety.

BACKGROUND OF THE INVENTION

Metal transaction cards and hybrid metal/plastic transaction cards are well known in the art, including as described in Patent Application Ser. No. US20150339564, titled TRANSACTION AND ID CARDS HAVING SELECTED TEXTURE AND COLORING, owned by the same owner of the present application and incorporated herein by reference.

As transaction card manufacturers, issuers, and owners seek new options for differentiating the appearance of their cards and creating cards that have more appeal, there is always a desire in the field to provide cards with unique features.

SUMMARY OF THE INVENTION

One aspect of the invention comprises a non-provisioned card having a front side and a back side, said card comprising at least one visible surface that is patinated or activated to promote patination. As used herein, the term "patina-ready" is used to refer to a surface that has been treated in some way to promote accelerated patination. The patinated or patina-ready surface preferably resides on a metal known for aesthetically pleasing patination, such as copper, bronze, and brass, most preferably copper, but may comprise any materials known for developing a patina, including but not limited to stone, wood, leather, and metals other than those noted above. In some embodiments, only one side (typically, but not limited to, the front side) of the card is patinated or patina-ready, but other embodiments may have patinated or patina-ready surfaces disposed on both the front and the back of the card. As used herein, the term "visible surface" means that the surface is visible to a user of the card as either the top surface or a surface that is covered only by transparent coatings or layers.

In some embodiments, the patinated or patina-ready surface resides on a decorative layer of a multi-layer card, but in other embodiments, the patinated or patina-ready surface may be a surface of a solid material, such as a solid metal. It should be understood that the metal in any of the constructions discussed herein may comprise a pure metal or an alloy of that metal.

Multi-layer cards have a core to which the decorative layer having the patinated or patina-ready visible surface is affixed. The core may be metal or non-metal. In one embodiment, the core comprises a first metal, such as stainless steel, and the decorative layer comprises a second metal, such as copper. In one embodiment, for example, the card may comprise a 0.002" layer of copper cladding over (e.g. rolled onto) a 0.018" layer of stainless steel. In embodiments having decorative layers on both the front and back of the card, the first patinated or patina-ready surface may reside on a first copper layer and the second patinated or patina-ready surface may reside on a second copper layer, and a stainless steel core may be disposed between the first copper layer and the second copper layer.

In some multilayer embodiments, the decorative layer may comprise a metal foil laminated to the core, such as a copper foil laminated to a stainless steel core. For example, in one embodiment, the foil may have a thickness in the range of 0.003"-0.005".

In embodiments having a decorative layer visible only from the front of the card, the card may comprise a decorative layer comprising a first metal, such as copper, a core comprising a second layer, such as stainless steel, and a plastic layer on the back of the card.

The non-provisioned card may comprise indicia that is decorative, informational, or a combination thereof, disposed on or over the patinated or patina-ready layer. A protective layer is preferably disposed over the patinated or patina-ready surface. Thus, the indicia may be considered to be "on" the patinated or patina-ready layer if it is in direct contact with that layer, and "over" the patinated layer if it is disposed on a different layer disposed above the patinated layer.

Another aspect of the invention comprises a process for making a transaction card having a front side and a back side, wherein the process comprises the step of patinating at least a first surface visible from at least one side of the card, and providing the card for provisioning and issuance to a card holder. The process typically further comprises treating the relevant surface to give it a higher affinity for patination prior to patinating it or prior to issuance of the card to an end user. For example, a metal surface may be treated to promote patination by activating the surface of the metal face by mechanically removing any oxide from the surface, such as but not limited to by the implementation of wet or dry blasting steps. The step of treating the surface may then comprise first chemically patinating the metal through an acid activation in the presence of a reductant, and then exposing the patinated metal surface to an alkaline solution. Suitable acids for use in the acid activation may be sulfamic acid, nitric acid, hydrochloric acid, sulfuric acid, formic acid, acetic acid, any other mono or multiprotic strong acid or weak acid, or any Lewis acid such as aluminum chloride. Suitable reductants may comprise thiourea, DTT, TCEP, or any other strong reductant known to those of skill in the art in the field of chemistry. Suitable alkaline solutions may comprise a bicarbonate salt, such as sodium bicarbonate. The invention is not limited to the use of any particular chemical agents, however. In other embodiments, processes for patinating the surface may comprise a flame treatment process or an electrolytic treatment process.

BRIEF DESCRIPTION OF THE DRAWINGS

FIG. 1 depicts an exemplary transaction card front side;

FIG. 2A depicts a portion of a cross-section of one exemplary multilayer card embodiment;

FIG. 2B depicts a portion of a cross-section of another exemplary solid card embodiment.

FIG. 2C depicts a portion of a cross-section of still another exemplary clad card embodiment.

FIG. 3 depicts an exemplary transaction card back side.

DETAILED DESCRIPTION OF THE INVENTION

Referring now to the figures, FIGS. 1 and 3 show, respectively, the front and back sides of an exemplary transaction card. FIGS. 2A and 2B are non-limiting cross-sectional schematic illustrations of exemplary card constructions.

As shown in FIG. 1, a typical transaction card 10 has a front surface 12 having an optional contact chip 14 and various indicia that may be printed, embossed, or otherwise disposed on the front surface of the card. Exemplary indicia include but are not limited to the name of the card issuer (e.g. a bank, a department store, etc.) 15, a first set of branding 16 (e.g. VISA®, MASTERCARD®, AMERICAN EXPRESS® and/or logos or graphics associated therewith), a card number 17, an expiration date 18, and the card owner name 19. As shown in FIG. 3, the back surface 32 of card 10 typically includes a magnetic stripe 34, a signature block 33, and may also include additional indicia, such as a security code 35, bar code 36, photograph of the cardholder 37, one or more additional sets of branding 38 (such as, for example a co-issuer's brand, or the same or different brand relating to the brand owner or issuer found on the front of the card), and one or more security features, such as a hologram 39. Additional indicia (not shown), such as graphic designs in various parts of the background of the card, may also be provided, and not all embodiments may have all of the indicia depicted herein. It should be understood that the locations (including whether on the front or back of the card) and type of indicia (and other features) may vary from card to card, and the invention is not limited in any way to specific indicia, their locations, or manner of providing them (e.g. printing, laser treatment, embossing, or the like).

Notably, a non-provisioned (i.e. "blank" card) typically lacks indicia such as the card number 17, expiration date 18, card owner name 17, and security code 35 (all of which are typically present provisioned cards as issued) as well as certain optional indicia that may be present only on certain cards, such as the photograph 32 and barcode 36. Certain other of the indicia mentioned above may be lacking as well, such as for example, if a card issuer has multiple types of branding on otherwise similar cards, or the same type of transaction card has multiple card issuers of otherwise identical cards. Non-provisioned cards also do not yet have information encoded on the magnetic stripe 34 or the chip 14. The term "non-provisioned card" as used herein means a card that is in any state in which it has not yet been fully personalized for issuance to an end-user, such as but not limited to the state at which a card blank is provided by a card manufacturer to a card issuer, such as a credit card company.

FIG. 2C illustrates a first exemplary card construction, comprising a multilayer card comprising a core 22, and a decorative layer 26. FIGS. 2A-2C are intended to show only a slice of the cross-section (not extending across the entire card from edge to edge) and are not to scale (i.e. the relative thickness of the layers is not depicted). Surface 28 of decorative layer comprises a patina or has been activated to promote patination. As is known in the art, a patina is "a thin layer that variously forms on the surface of stone; on copper, bronze and similar metals (tarnish produced by oxidation or other chemical processes); on wood (a sheen produced by age, wear, and polishing); or any such acquired change of a surface through age and exposure." Wikipedia. On a metal surface, the patina may comprise a naturally occurring coating of various chemical compounds, such as but not limited to oxides, carbonates, sulfides, sulfates, and chlorides of that metal formed on the metal surface. For example, the composition of exemplary copper patinas are known to comprise cupreous and cupric sulfide, cupric oxide, copper sulfate, copper chloride, and combinations thereof, depending upon the environmental exposure of the copper. The patinas are not limited to any particular compositions. In preferred embodiments of the invention, decorative layer 26 is a metal, such as but not limited to copper, brass or bronze, most preferably copper, but decorative layer may comprise other surfaces that have been patinated or that have been treated to promote patination. Any techniques known in the art for treating a surface to create a patina or for making the surface patina-ready by activating to the surface to promote patination may be used, some of which are further described herein.

In the alternate embodiment illustrated in FIG. 2B, rather than comprising a multi-layer construction, the card may comprise a solid 206, such as a solid metal or metal alloy, such as copper, having front 208 and back 209 patinated surfaces. As used herein the term "multi-layer card" refers to a card having multiple layers between the patinated surface and an opposing surface of the card.

As shown in FIG. 2A, the patinated surface 28 preferably further has a protective layer 29 applied thereon, such as any of the protective layers or combinations thereof disclosed in U.S. Published Application No. 20150180229, titled "CARD WITH METAL LAYER AND ELECTROSTATIC PROTECTION," listing John Herslow as the inventor, and owned by the Applicant of the present invention. Although shown only in FIG. 2A, it should be understood that similar protective layers (not shown) may be present over layers 208 and 209 in FIG. 2B and over both the patinated layer 28 and back surface of the metal core 22, shown in FIG. 2C.

In certain multi-layer card embodiments, such as shown in FIG. 2A, core 22 may comprise a non-metal structure, such as but not limited to plastic, ceramic, wood, or a combination thereof. As used herein, any reference to a "plastic layer" should be understood to comprise any compound known in the art and typically referred to as a plastic, polymer or resin, and in particular, such compounds known for use in the manufacture of transaction cards, such as but not limited to polyvinyl chloride (PVC). Furthermore, any reference to a plastic "layer" may actually comprise multiple layers of plastic, such as layers of the same or different plastics that are fused together to become permanently bonded to one another during a lamination step. In other embodiments, core 22 may comprise a metal, and in particular, core 22 may comprise a first metal, such as but not limited to stainless steel, and decorative layer 26 may comprise a second metal, such as but not limited to copper. In one embodiment, layer 24 shown affixed to the back of core 22 may comprise a plastic layer 24. In another embodiment, layer 24 may comprise another metal (e.g. copper) layer, such that the layers comprise copper/stainless/copper.

Embodiments having only one patinated side, typically on the front of the card (but not limited thereto), may be more desirable than embodiments with two patinated sides, as patination or tarnishing may be desirable on only one of the surfaces. To prevent unwanted or further tarnishing, a surface coating (e.g. a patina retardant) can be provided on a patinated (or unpatinated) surface to prevent further (or any) patination or tarnishing. For example, the protective coating referred to herein provides at least some patina retardation relative to a surface with no such coating, and in particular, the protective coatings as described in the prior pending application incorporated by reference above are expected to almost fully prevent further patination. Other coatings, however, that are more permeable to gases such as oxygen and/or moisture, which promote patination, may permit continued patination after application of the coating. Thus, once a desired degree of patination has been achieved, the patinated surface(s) is then treated, coated, or covered to prevent (or retard to a desired degree) further patination. Accordingly, in embodiments with two metal sides, one side may have a patinated or patina-ready surface, and the opposite side may be treated to prevent patination or restrict further patination. Thus, the patinated surfaces referred to herein may have a desired degree of patination and protected from additional patination, or partially patinated and exposed to additional patination. It should be understood that certain treatments may facilitate rapid patination, whereas others may significantly deter but not completely prevent some patination, and that even an already-patinated surface may undergo further patination over time at a normal rate, if not treated to accelerate or deter such patination.

Thus, aspects of the invention include embodiments in which different sides of a card may comprise identical patina-susceptible materials with different surface treatments to facilitate different rates of patination and/or different surface treatments over the patinated or patina-susceptible surfaces (e.g. the front side may comprise copper with a relatively high degree of patination with a treatment that will permit some further patination at a first rate that is relatively less than would occur on an untreated surface, and the back side may have relatively minimal or no patination with a treatment intended to fully prevent patination after issuance or minimize patination by permitting patination at a second rate that is relatively less than the coating on the front side of the card permits, or both sides treated to retard patination, but one side treated with a compound that is more patina retardant than the other).

Thus, some embodiments may have portions covered with a protective coating where a patina is not desired, and other portions left uncovered (or differently covered) where a patina is desired. The covered and uncovered/differently covered portions may be on the same (e.g. front) surface of the card. For example, it may be desirable not to have substantial patina in areas of the card in which critical information is provided (such as the card number and name of the card holder), and to freely permit patination in otherwise blank and decorative areas of the card. In certain embodiments, the same side of a card may have a first portion covered with a first coating having a first degree of patina-retarding performance and a second portion covered with a second coating having a second degree of patina-retarding performance. In one exemplary manufacturing process, the entire surface may first be covered with a patina-retardant or patina-preventative coating, and then the coating removed in areas in which a patina is desired. The removal may be performed, for example, with a laser, or with a chemical removal step, but the removal is not limited to any particular action. Similarly, a uniform coating over a single surface of the card may have certain sections rendered less protective (but the coating not fully removed).

One exemplary manufacturing process comprises patinating copper through an acid activation in the presence of a reductant, followed by exposure to a sodium bicarbonate solution. Patination may also be provided by a flame patina process or an electrolytic process. A patina-ready surface may be provided by activating the metal (e.g. copper) surface by physically removing any oxide off of the surface, such as through mechanical means, such as wet or dry blasting. The step of providing the patina-ready surface may be performed before the patination steps described herein, the patina created, and then the card issued to the card holder, or the card may be issued to a cardholder in its patina ready state to permit personalized patination by the user over time. The process for creating the patina is not limited to any particular process, however, and may comprise any process known in the art, including, for example, processes discussed in *The Colouring, Bronzing and Patination of Metals*, by Richard Hughes and Michael Rowe, Watson-Guptill Publications (Feb. 1, 1991), incorporated herein by reference.

To the extent that prior art cards may have been capable of forming some degree of wear that can be characterized as a patina over time in the hands of a card holder, what distinguishes the process described herein, is that a desired degree of patination is created before providing the card for issuance to a card holder, or the card is intentionally treated to accelerate patination relative to a card that has not been so treated. What distinguishes the card itself from prior art cards that have undergone some degree of natural patination, is that the non-provisioned card (prior to issuance to the cardholder and as delivered to the card issuer has a desired degree of patination or a surface treatment to permit accelerated patination, and in some embodiments has a certain degree of patination on at least one visible surface or layer that has been preserved by a patina retardant layer or coating. The desired degree of patination may be any amount of intentionally created patination that is noticeably visible to the human eye. Prior art cards or substrates on which cards are made comprising materials susceptible to patination, if ever inadvertently created or received with some degree of unintentional patination during the manufacture process, would have been rejected, and no amount of unintentional patination can ever be characterized as a desired degree of patination. Rejected in-process substrates or cards would have resulted in the cards or substrates being scrapped or processed to remove undesirable visible patination prior to receiving any protective coatings thereon or further processing toward making a final non-provisioned card, and would not even reach the stage of being provided for provisioning.

By contrast, a card in accordance with the present invention in its non-provisioned state (i.e. the card "blank" that has not yet been personalized with user-specific information but is otherwise ready for such provisioning and providing to a card issuer for such provisioning) has a patinated or patina-ready surface having a desired degree of patination, preserved by a surface coating that at least retards further patination. It should be understood that the phrase "providing the card for issuance" means the step of providing a blank card to a card issuer for further provisioning to configure the card to make it ready to conduct transactions. Thus, additional steps, carried out by one or more parties, are expected to occur between the step of providing the non-provisioned card for issuance and actual issuance and delivery of a provisioned card to the cardholder, in accordance with processes and methods well known in the art.

EXAMPLES

Example 1: Hybrid (Metal-Plastic) Card

As shown in FIG. 2C, metal decorative layer 26 comprises copper cladding 28 (rolled) onto a stable core 22, such as stainless steel. The patinated surface has a protective layer 29, such as the transferable, protective hard coat described herein. Although no additional layers are shown in the embodiment illustrated in FIG. 2C, it should be understood that various other embodiments may have additional layers. For example, in one exemplary embodiment, a 0.002" layer of copper may be rolled onto a 0.018" stainless steel core, and a plastic layer 24 (such as is shown in FIG. 2A) (~0.01")

may be applied to the non-copper-clad surface of the core. In other embodiments, decorative layers, which may comprise different materials, may be provided on both the front and back of the card, such as copper cladding on both sides of the core. The multiple decorative layers may then be treated identically (e.g. both patinated), or differently (e.g. one significantly patinated, and one not or not as much), as described further herein.

Example 2: All Metal Card

As shown in FIG. 2B, a solid metal or metal alloy card 206 may have patinated surfaces 207 and 208 on both the front and back surface, and each of the patinated surfaces has a protective layer 29 or 29', such as a transferable, protective hard coat as shown and described herein. Although illustrated in this embodiment with both the front and back surfaces patinated, it should be understood that different degrees of patination (including no patination on one surface) may be provided on the front and back surfaces, and the protective layers 29 and 29' may be the same or may be different on the front and back. So, for example, assuming layer 208 is visible from the front of the card and layer 209 is visible from the back of the card, layer 208 may have a greater degree of patination than layer 209 (and layer 209 may not be present at all in some embodiments), and layer 29 disposed over layer 208 may provide a lesser degree of patina retardation than layer 29' disposed over layer 209. Thus, for example, in a copper card (which may be a solid card as depicted in FIG. 2B or may have layers of copper on the front and back as described herein), the front surface may be significantly patinated, and the back surface may remain an unpatinated shiny copper color or may be only slightly patinated, with the back protective layer having a coating designed to prevent or significantly retard further patination over the expected life of the card. By contrast, the front protective layer may have a coating designed to retard significant further patination, but to retard or prevent patination to a lesser degree than the coating on the back surface, so as to permit some additional personalized patination over time during use by the end user. In non-solid card embodiments, the metal layer on one side may be different than the metal layer (or exposed metal core) on the other side, and each metal may have different susceptibilities to patination (including relatively no susceptibility) and/or different degrees of patination.

Example 3: Cu Veneer (Metal-Plastic) Card

As shown in FIG. 2A, a thin copper foil (on avg. 0.003"-0.005") is laminated with an adhesive (adhesive layer not shown) to a stainless steel core 22 (~0.015"), and plastic back 24 is laminated to the Cu/SS. This 3 part lamination may be performed in a single process combining the 3 components, or stepwise 2 components at a time. Plastic layer 24 may actually comprise several layers of plastic that fuse to become permanently bonded during lamination. The copper surface further has a protective hard coat 29 disposed thereon, as described herein.

Example 4: Exemplary Patination

An exemplary patination process may include surface treatment, salt exposure, and lamination with protective coating. For surface treatment, the copper material is wet blasted with crushed glass or other appropriate media such as aluminum oxide. The sheet is then wiped with a solution containing thiourea and sulfamic acid. The sheet is then sequentially wiped with methyl ethyl ketone and isopropanol alcohol and dried with air. The sheet is then submerged into a sodium bicarbonate solution (0.5 ounces/quart-m/v) for 30 minutes. The sheet is then rinsed with RO water and dried with air. A protective hard coat is transferred to the outer facing side of the sheet by platen lamination, thereby essentially freezing the patination process at the degree of patination acquired at the time the hard coat is applied. The sheet is now ready for further processing into cards ready for provisioning.

In all of the above examples, the visible surfaces of the cards may have various indicia disposed on them, such as but not limited to by lasering or inkjet printing. The indicia may include, for example, decorative or informational markings, including graphics, patterns, textures, and the like, made in or disposed over the decorative layer by any method known in the art. Although not illustrated in the figures, it should be understood that in multi-layer embodiments, each patinated decorative layer may stretch over the entire front or back surface of the card, or may be disposed in a pocket surrounded by a frame, such as is illustrated in FIGS. 10A-10C of US20150339564. In such embodiments, the materials of the frame may comprise metal or non-metal construction, and the card may have any number of additional layers below the frame or above the decorative layer disposed in the pocket. It should also be understood that in such a construction, the decorative layer typically comprises a majority of the surface on the side of the card that it faces, and to the extent metal contacts may be present thereon for a chip card, the decorative layer comprises a different material or a differently treated material than the contacts, with the decorative layer having a greater degree of patination than the contacts. Thus, to the extent that known metal contacts on chip cards may patina over time, such contacts do not constitute a majority of the card (or the entire surface of the card, like the decorative surface in some embodiments), and they are not patinated in the non-provisioned state of the card and covered with a protective layer, as is the case with the decorative layer described herein.

Although the invention is illustrated and described herein with reference to specific embodiments, the invention is not intended to be limited to the details shown. Rather, various modifications may be made in the details within the scope and range of equivalents of the claims and without departing from the invention. In particular, although certain combinations and permutations of layers have been shown, it should be understood that the card may have any number of layers, including various layers known in the field of transaction cards but not described here, including adhesive layers (which may or may not comprise a carrier film for the adhesive) disposed between functional layers, and that any single layer described herein may actually comprise a composite of multiple layers of the same or different materials. It should also be understood that the term "layer" as used herein may refer to a layer that is disposed upon another layer by any method known in the art, including but not limited to adhesive bonding, lamination, fusing, cladding, coating, or deposition processes (such as chemical or physical vapor deposition). Furthermore, although described herein with respect to a transaction card, it should be understood that the invention may be applied to any type of card, including but not limited to identification cards, loyalty cards, pass cards, and the like, all of which generally have a non-provisioned state in which they are provided for issuance and provisioning (e.g. personalized in some manner) before being issued to a user.

What is claimed:

1. A process for making a transaction card having first and second visible surfaces including a first area and at least one of the first and second visible surfaces including a second area separate from the first area, the method comprising:
treating at least the first area with a first patina-retarding or patina-preventing surface treatment, coating or layer, such that a degree of patina retardation or prevention of the first area is greater than a degree of patina retardation or prevention of the second area not so treated; and
after treating at least the first area, providing the card for provisioning and issuance to a card holder.

2. The process of claim 1, wherein the first area comprises a patinated surface having a desired degree of perceptible patination, wherein the first area resides on a metal substrate and the step of treating the first area comprises, prior to treating at least the first area with the first patina-retarding or patina-preventing surface treatment, coating or layer, first chemically patinating the metal substrate through an acid activation in the presence of a reductant, then exposing the patinated metal surface to an alkaline solution.

3. The process of claim 2, wherein the alkaline solution comprises a bicarbonate salt solution.

4. The process of claim 1, wherein the first surface resides on a metal substrate and the step of treating the surface comprises a flame treatment.

5. The process of claim 1, wherein the first surface resides on a metal substrate and the step of treating the surface comprises an electrolytic treatment.

6. The process of claim 1, wherein the first surface resides on a metal substrate and the step of treating to promote patination comprises activating a surface of a metal face of the metal substrate by mechanically removing any oxide from the surface.

7. The process of claim 6, wherein the step of mechanically removing the oxide comprises wet or dry blasting.

8. The process of claim 1, wherein the patinated or patina-ready surface resides on a substrate from the group consisting of: stone, wood, metal and leather.

9. The process of claim 1, wherein the first area resides on a substrate comprising a metal selected from the group consisting of: copper, bronze, brass, silver, and alloys containing one or more the foregoing.

10. The process of claim 1, wherein the first area resides on a decorative layer of a multi-layer card.

11. The process of claim 10, wherein the card comprises a core with the decorative layer affixed to the core.

12. The process of claim 11, wherein the core is non-metal and the decorative layer comprises metal.

13. The process of claim 11, wherein the core comprises a first metal and the decorative layer comprises a second metal.

14. The process of claim 13, wherein the decorative layer comprises copper and the core comprises stainless steel.

15. The process of claim 14, wherein the card comprises a 0.002 inch layer of copper rolled onto a 0.018 inch layer of stainless steel.

16. The process of claim 10, wherein the decorative layer comprises a metal foil laminated to a core.

17. The process of claim 16, wherein the metal foil comprises copper and the core comprises stainless steel.

18. The process of claim 17, wherein the foil has a thickness in the range of 0.003 inches to 0.005 inches.

19. The process of claim 10, wherein the decorative layer is on a front of the card and the card further comprises a plastic layer on the back of the card.

20. The process of claim 1, wherein the first area is provided on the first visible surface, and the second area is provided on the second visible surface.

21. The process of claim 1, wherein the first area is disposed on a front of the card.

22. The process of claim 1, wherein the first area comprises a first patinated surface disposed on a front side of the card and the second area comprises a second patinated surface disposed on a back side of the card.

23. The process of claim 22, wherein the first area resides on a first copper layer and the second area resides on a second copper layer.

24. The process of claim 23, wherein the card is a multi-layer card having a stainless steel core disposed between the first copper layer and the second copper layer.

25. The process of claim 1, further comprising a treating the second area with a second patina-retarding or patina-preventing, surface treatment, coating or layer.

26. The process of claim 25, wherein the second patina-retarding or patina-preventing surface treatment, coating or layer is disposed over an entirety of the second area.

27. The process of claim 26, wherein the first area and the second area each comprise a same material, and the first patina-retarding or patina-preventing surface treatment, coating or layer provides a different rate of patina retardation or prevention than that of the second patina-retarding or patina-preventing surface treatment, coating or layer.

28. The process of claim 1, further comprising indicia that is decorative, informational, or a combination thereof, disposed on or over the first area.

29. The process of claim 1, wherein the first and second areas are both provided on the first visible surface of the card, the second area comprises an area containing card indicia selected from the group consisting of the card number and the cardholder name, and the first area comprises an area not containing the card indicia.

30. A process for making a transaction card having first and second visible surfaces including a first area and at least one of the first and second visible surfaces including a second area separate from the first area, the method comprising:
treating at least the first area with a first patina-accelerating surface treatment, coating or layer, such that a rate of accelerated patination of the first area is greater than a rate of patination of the second area; and
after treating at least the first area, providing the card for provisioning and issuance to a card holder.

31. The process of claim 30, wherein the first area resides on a substrate comprising a metal selected from the group consisting of: copper, bronze, brass, silver, and alloys containing one or more the foregoing.

32. The process of claim 30, wherein the first area resides on a decorative layer of a multi-layer card.

33. The process of claim 32, wherein the card comprises a core with the decorative layer affixed to the core.

34. The process of claim 33, wherein the core comprises a first metal and the decorative layer comprises a second metal.

35. The process of claim 34, wherein the decorative layer comprises copper and the core comprises stainless steel.

36. The process of claim 35, wherein the card comprises a 0.002 inch layer of copper rolled onto a 0.018 inch layer of stainless steel.

37. The process of claim 32, wherein the decorative layer comprises a metal foil laminated to a core.

38. The process of claim 37, wherein the metal foil comprises copper and the core comprises stainless steel.

39. The process of claim 38, wherein the foil has a thickness in the range of 0.003 inches to 0.005 inches.

40. The process of claim 30, wherein the first area is provided on the first visible surface, and the second area is provided on the second visible surface.

41. The process of claim 30, wherein the first area is disposed on a front of the card.

42. The process of claim 30, wherein the first area comprises a first surface disposed on a front side of the card and the second area comprises a second surface disposed on a back side of the card.

43. The process of claim 42, wherein the first area resides on a first copper layer and the second area resides on a second copper layer.

44. The process of claim 43, wherein the card is a multi-layer card having a stainless steel core disposed between the first copper layer and the second copper layer.

45. The process of claim 30, further comprising treating the second area with a second patina-accelerating surface treatment, coating or layer.

46. The process of claim 45, wherein the second patina-accelerating surface treatment, coating or layer is disposed over an entirety of the second area.

47. The process of claim 46, wherein the first area and the second area each comprise a same material, and the first patina-accelerating surface treatment, coating or layer provides a different rate of patina acceleration than that provided by the second patina-accelerating surface treatment, coating or layer.

48. The process of claim 30, further comprising indicia that is decorative, informational, or a combination thereof, disposed on or over the first area.

49. The process of claim 30, wherein the first and second areas are both provided on the first visible surface of the card, the second area comprises an area containing card indicia selected from the group consisting of the card number and the cardholder name, and the first area comprises an area not containing the card indicia.

* * * * *

UNITED STATES PATENT AND TRADEMARK OFFICE
CERTIFICATE OF CORRECTION

| | | |
|---|---|---|
| PATENT NO. | : 12,208,599 B2 | Page 1 of 1 |
| APPLICATION NO. | : 17/166080 | |
| DATED | : January 28, 2025 | |
| INVENTOR(S) | : Adam Lowe | |

It is certified that error appears in the above-identified patent and that said Letters Patent is hereby corrected as shown below:

In the Claims

In Column 10, Line 16 in Claim 25 the word "comprising a" should read -- comprising --.

Signed and Sealed this
Eleventh Day of March, 2025

Coke Morgan Stewart
*Acting Director of the United States Patent and Trademark Office*